United States Patent [19]

Karr, Jr.

[11] 4,436,316
[45] Mar. 13, 1984

[54] FLUID SEAL

[76] Inventor: Michael A. Karr, Jr., 9353 Rosstown Way, Houston, Tex. 77080

[21] Appl. No.: 365,350

[22] Filed: Apr. 5, 1982

[51] Int. Cl.³ .............................................. F16J 15/16
[52] U.S. Cl. ................................. 277/124; 277/188 A
[58] Field of Search .................. 277/207, 207 A, 208, 277/209, 210, 211, 123, 124, 125, 188 A

[56] References Cited

U.S. PATENT DOCUMENTS

| | | | |
|---|---|---|---|
| 1,725,836 | 8/1929 | Solberg | 277/188 A |
| 3,009,721 | 11/1961 | Newton | 277/188 A |
| 3,192,942 | 7/1965 | Manor et al. | 277/124 |
| 3,790,179 | 2/1974 | Scannell | 277/124 |

Primary Examiner—Robert I. Smith
Attorney, Agent, or Firm—Robert S. Smith

[57] ABSTRACT

A seal assembly which includes a first seal ring having a geometric axis. The first seal ring has a unitary support member having a cross section which is generally T-shaped. The T-shaped cross section is defined by a hoop shaped section, having inner and outer faces, which is coaxial with the geometric axis and a section of a generally disc shaped section which is also coaxial with the geometric axis. A first annular elastomeric seal abuts one of the faces; and a second annular elastomeric seal abuts the other of the faces.

7 Claims, 4 Drawing Figures

FLUID SEAL

BACKGROUND OF THE INVENTION

The invention relates to fluid seals and packings which have particular application to a high pressure rod or a stem seal. The prior art include O-rings and other squeeze packings, compression packings and seals, face seals and pressure-energized seals of various types.

The apparatus in accordance with the invention may be used in place of conventional compression packings and seals as well as other sealing apparatus. In a conventional compression seal a material such as aluminum, copper, lead foil, TFE elastomers, leather, flax, cotton, flexible graphite, plastics or asbestos, is stacked or packed into an annular cavity and a seal against a rod or stem element is achieved. This seal is obtained, at least in part, due to the compression imposed by the cooperating housing members or the fluid pressures which are contained by the seal. At high pressures, presently available packing elements tend to become a solid mass once their internal shear resistance is exceeded by the contained pressure. Thus, the packing or packing set responds as one seal with no backup or secondary sealing ability.

It is an object of the invention to provide a seal assembly which, at least in some embodiments of the invention, provides true seal redundancy.

It is another object of the invention to provide a seal assembly which will positively seal even at high pressures.

SUMMARY OF THE INVENTION

It has now been found that these and other objects of the invention are attained in a seal assembly which includes a first seal ring having a geometric axis. The first seal ring has a unitary support member having a cross-section which is generally T-shaped. The T-shaped cross-section is defined by a hoop shaped section, having inner and outer faces, which is coaxial with the geometric axis and a section of a generally disc shaped section which is also coaxial with the geometric axis. The seal ring also includes a first annular elastic seal abutting one of the faces and a second annular elastomeric seal abutting the other of the faces.

In some forms of the invention one or both of the annular elastomeric seals has a cross section which is generally trapezoidal.

The first or second annular elastomeric seal may have axial extremities which converge towards the hoop shaped section and the generally disc shaped section is axially tapered to axially abut one axial extremity of the first annular elastomeric seal.

A second seal ring may also be provided, which also has a geometric axis and includes a unitary support member having a cross section which is generally T-shaped. The T-shape may be defined by a hoop shaped section, having inner and outer faces, which is coaxial with the geometric axis and a section of a generally disc shaped section which is also coaxial with the geometric axis. A first annular elastomeric seal abuts one of the faces; and a second annular elastomeric seal abuts the other of the faces. The second seal ring may also have the other features of the first seal ring.

The seal assembly may include a cylindrical housing thereabout which includes a weep hole. A hoop shaped backup member may extend around the outer circumference of each seal assembly in abutting relationship to one of the annular elastomeric seals.

BRIEF DESCRIPTION OF THE ACCOMPANYING DRAWING

DESCRIPTION OF THE PREFERRED EMBODIMENT

Figure 1:
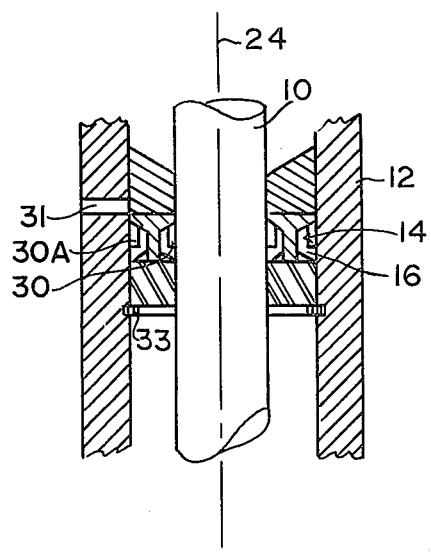
FIG. 1 is a view, in partial section, of a rod seal in accordance with the invention.
Figure 3:
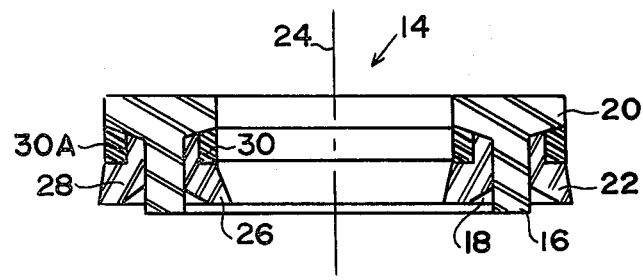
FIG. 3 is a sectional view, to an enlarged scale, of the seal ring illustrated in FIG. 1.

Referring now to FIG. 1, there is shown a rod 10 which is mounted for axial movement within a cylindrical housing 12 with an intermediate seal assembly 14. The seal assembly 14 includes first and second support members 16, 16 which each have a generally T-shaped cross section and are disposed with the "bottoms" in axially abutting relationship. Each support member 16 is of unitary construction. Although of unitary construction, the support member 16 may be conceptually understood if considered as two discrete sections. The construction of a single seal ring is best shown in FIG. 3 and the discrete sections are also best shown there. A hoop shaped section 18 which is coaxial with the seal ring of the seal assembly 14 and a disc shaped section 20 which is also coaxial with the seal ring of the seal assembly will be seen.

Figure 2:
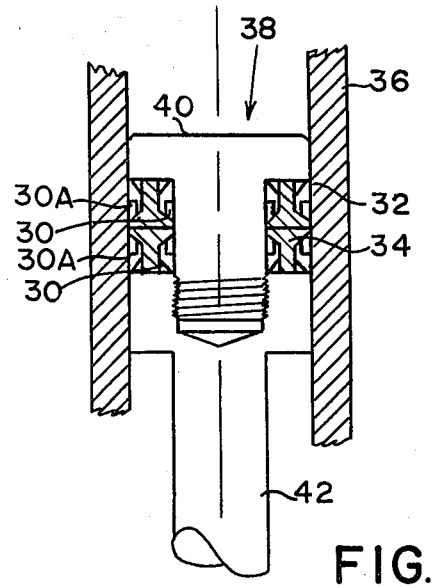
FIG. 2 is a view, in partial section, of a piston seal in accordance with another form of the invention.
Figure 4:
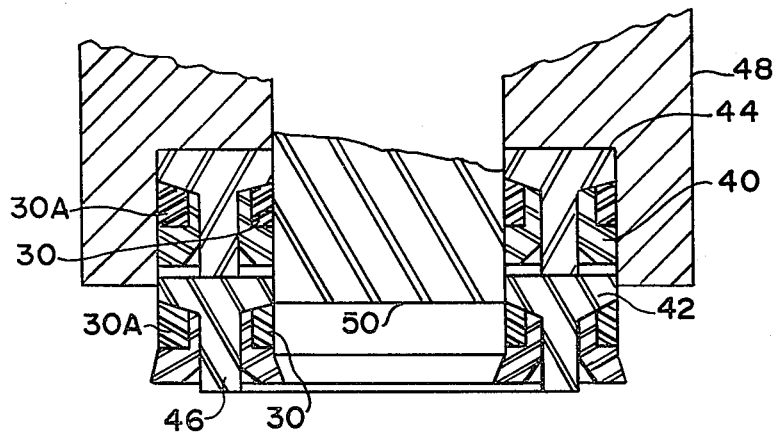
FIG. 4 is a view, in partial section, of another embodiment of a seal assembly in accordance with the invention which is generally similar to the seal assembly illustrated in FIG. 2.

In various other seal assemblies a plurality of the seal rings, such as those illustrated in FIG. 3, may be disposed in axially abutting relationship. The axial abutting relationship may be either between disc shaped sections 20 of two abutting seal rings or with the hoop shaped section 16 abutting the disc shaped section 20 of another seal ring. In other words, they may be disposed with the "tops" of the T-shaped cross-section abutting as shown in FIG. 2, with the "bottoms" abutting as shown in FIG. 1 or with the "bottom" abutting a "top" of a T-shaped cross-section as shown in FIG. 4.

In the embodiment illustrated in FIG. 1 there is shown a weep hole 31 which is intended to allow observation of any leakage past the seal assembly 14. A retainer 33, which may be a snap ring, is provided in the assembly.

Each hoop shaped section 16 has an inner face which faces the geometric center line 24 and an opposite or outer face. Disposed in abutting relationship to the inner and outer faces of the hoop shaped member 16 are annular elastomeric seals 26, 28. The cross-sections of the annular elastomeric seals 26, 28 are generally trapezoidal (except for a notch for respective back-up rings 30, 30A) with the axial extremities thereof converging toward the hoop shaped section 16. The backup ring 30 or 30A may extend proximate to one of the annular elastomeric seals 26, 28.

In the embodiments of FIGS. 1, 2, 3 and 4, a backup ring 30 supports the inner face of the seal and the backup ring 30A supports the outer face.

In the preferred embodiment the disc shaped section 20 of the assembly 14 is axially tapered so that there is an abutting relationship between the annular elastomeric seals 26 and 28, as best seen in FIG. 3. Similarly the backup rings 30 and 30A also have an axial taper to provide an abutting relationship with the axial taper of the disc shaped section 20.

In the piston seal assembly illustrated in FIG. 4, there are shown two seal rings 32, 34 which are generally similar to the seal assemblies 14. Because the piston seal is designed for holding pressure within the cylinder 36 both above the piston 38 and below the piston 38, the seal rings 32 and 34 are disposed with the disc shaped sections of the individual seal rings 32, 34 in axially abutting relationship.

In the embodiment illustrated in FIG. 2, the seal rings 32, 34 are provided with backup rings extending about the outer face. In other words, the backup rings illustrated are disposed along the face of the seal at which elative motion occurs between the piston 38 and the cylinder 36. Similarly, in the assembly illustrated in FIG. 1, the backup ring is disposed at the inner face between the seal assembly 14 and the rod 10. It is at this inner face that relative motion occurs. In the assembly illustrated in FIG. 2, the piston 38 includes a member 40 which is effectively a large bolt engaging the head of the rod 42. Screw threads therebetween allow imposition of an axial force on a seal assembly which includes seal rings 32, 34. Because of the nature of the construction of the seal rings 32, 34 the force imposed by the bolt 40 as it is tightened does not crush the elastomeric seals cooperating with the seal rings 32, 34 which are generally constructed in the same manner as the seal assembly 14 in FIG. 1.

Referring now to FIG. 4, there is shown another embodiment of the invention having characteristics which are generally similar to the embodiments previously described. Seal rings 40, 42 are disposed in axially abutting relationship with the respective disc shaped sections 44, 46 disposed in axially spaced relationship. In this configuration the seal rings 40, 42 provide independent sealing action which results in a true redundancy so that fluid pressure intermediate the cylinder 48 and rod or piston 50 will be prevented initially by the seal ring 42. In the event of the failure of the seal ring 42, the seal ring 40 will independently act to prevent leakage intermediate the cylinder 48 and the rod or piston 50.

The support member 18 illustrated in FIG. 3 is, of course, similar in each of the embodiments illustrated. In general this support member will be manufactured of a strong material such as a metal or certain plastics such as nylon or Teflon (Trademark of Du Pont de Nemours, Wilmington, Delaware). The strength of these elements is important in assemblies utilizing multiple seal rings such as those illustrated in FIGS. 1, 2 and 4 so that axial compression of the annular elastomeric seals is prevented. Thus extrusion of the annular elastomeric seal is prevented.

The annular elastomeric seals may be manufactured of rubber or other similar known seal materials. Although the term elastomeric has been used in this application it will be understood that the apparatus may also be manufactured of a wide variety of materials which may not be strictly considered to be elastomeric. For example, the materials may be nylon, teflon, or other plastics. Additionally metals or other materials which are in elastic at normal temperatures may be utilized at higher temperaturers when their physical properties allow.

The invention has been described with reference to its illustrated preferred embodiment. Persons skilled in the art of constructing fluid seals may, upon exposure to the teachings herein, conceive variations in the mechanical development of the components therein. Such variations are deemed to be encompassed by the disclosure, the invention being delimited only by the appended claims.

Having thus described my invention, I claim:

1. A seal assembly which comprises:
a first seal ring having a geometric axis, said first seal ring having a unitary substantially rigid support member having a cross section which is generally T-shaped, said T-shaped cross section being defined by a hoop shaped section, having inner and outer faces, which is coaxial with said geometric axis and a section of a generally disc shaped section which is also coaxial with said geometric axis; a first annular elastic seal abutting one of said faces; and a second annular elastic seal abutting the other of said faces;
a second seal ring which also has a geometric axis, said second seal ring has a unitary substantially rigid support member having a cross section which is generally T-shaped, the T-shape being defined by a hoop shaped section having inner and outer faces, which is coaxial with said geometric axis, and a section of a generally disc shaped section which is also coaxial with said geometric axis; a first annular elastic seal abutting one of said faces; and a second annular elastic seal abutting the other of said faces;
said first and said second seal rings and said respective unitary substantially rigid support members thereof are disposed in coaxial and axially abutting relationship;
said seal assembly includes a cylindrical housing thereabout which includes a weep hole; and
a hoop shaped backup member extends around the outer circumference of each seal assembly in abutting relationship to one of said annular elastic seals.

2. The apparatus as described in claim 1, wherein:
said first disc shaped section of said first seal ring is axially spaced from said disc shaped section of said second seal ring.

3. The apparatus as described in claim 2, wherein:
said first hoop shaped section of said first seal ring is disposed in abutting relationship with said disc shaped section of said second seal ring.

4. The apparatus as described in claim 3, wherein:
both of said annular elastic seals have axially extremities which converge towards said hoop shaped section associated therewith and said generally disc shaped section associated therewith is axially tapered to axially abut one axial extremity of said annular elastic seal.

5. The apparatus as described in claims 1, 2, 3, or 4, further including:
a hooped shaped backup member extending around the inner circumference of each seal assembly in abutting relationship to one of said annular elastic seals.

6. A seal assembly which comprises:
a first seal ring having a geometric axis, said first seal ring having a unitary substantially rigid support member having a cross section which is generally T-shaped, said T-shaped cross section being defined by a hoop shaped section, having inner and outer faces, which is coaxial with said geometric axis and a section of a generally disc shaped section which is also coaxial with said geometric axis; a first annular elastic seal abutting one of said faces; and a second annular elastic seal abutting the other of said faces;

said seal assembly includes a cylindrical housing thereabout which includes a weep hole; and a hoop shaped backup member extending around the outer circumference of each seal assembly in abutting relationship to one of said annular elastic seals.

7. The apparatus as described in claim 6, wherein: each of said annular elastic seals have axially extremities which converge towards said hoop shaped section associated therewith and said generally disc shaped section associated therewith is axially tapered to axially abut one axial extremity of said annular elastic seal.

* * * * *